US006906808B2

(12) United States Patent
Trantow et al.

(10) Patent No.: US 6,906,808 B2
(45) Date of Patent: Jun. 14, 2005

(54) METHODS AND APPARATUS FOR MEASURING A SURFACE CONTOUR OF AN OBJECT

(75) Inventors: Richard L. Trantow, Denoe Bay, OR (US); Joseph B. Ross, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 54 days.

(21) Appl. No.: 10/160,532

(22) Filed: May 30, 2002

(65) Prior Publication Data

US 2003/0223082 A1 Dec. 4, 2003

(51) Int. Cl.[7] .............................................. G01B 11/24
(52) U.S. Cl. ...................................................... 356/601
(58) Field of Search ................................ 356/600–601, 356/394, 445; 382/108, 309; 250/559.22

(56) References Cited

U.S. PATENT DOCUMENTS

| | | | | |
|---|---|---|---|---|
| 2,645,971 A | * | 7/1953 | Herbst ........................ 356/601 |
| 2,958,255 A | * | 11/1960 | Dietrich ...................... 356/601 |
| 4,021,121 A | * | 5/1977 | Schicketanz ............... 356/73.1 |
| 4,071,820 A | | 1/1978 | Mushinsky | |
| 4,197,007 A | * | 4/1980 | Costa et al. ................ 356/73.1 |
| 4,437,213 A | | 3/1984 | Reese et al. | |
| 4,709,156 A | * | 11/1987 | Murphy et al. ........ 250/559.22 |
| 4,873,414 A | * | 10/1989 | Ma et al. .................. 219/121.7 |
| 4,875,777 A | | 10/1989 | Harding | |
| 4,908,782 A | * | 3/1990 | Pekarek et al. ............. 702/167 |
| 4,946,587 A | | 8/1990 | Reeves et al. | |
| 5,014,439 A | | 5/1991 | Butzin et al. | |
| 5,416,589 A | * | 5/1995 | Lysogorski ................. 356/601 |
| 5,463,464 A | * | 10/1995 | Ladewski .................... 356/601 |
| 5,465,153 A | * | 11/1995 | Ladewski .................... 356/601 |
| 5,513,539 A | | 5/1996 | McLaughlin et al. | |
| 5,517,575 A | * | 5/1996 | Ladewski .................... 382/108 |
| 5,539,837 A | | 7/1996 | Lindmark | |
| 5,570,186 A | | 10/1996 | Satzger et al. | |
| 5,745,238 A | * | 4/1998 | Long et al. ................. 356/601 |
| 5,914,055 A | | 6/1999 | Roberts et al. | |
| 6,094,269 A | | 7/2000 | Ben-Dove et al. | |
| 6,154,274 A | | 11/2000 | Davis et al. | |
| 6,179,567 B1 | | 1/2001 | Stauffer et al. | |
| 6,195,168 B1 | * | 2/2001 | De Lega et al. ............ 356/497 |
| 6,226,118 B1 | * | 5/2001 | Koyama et al. ............ 359/380 |
| 6,409,471 B1 | | 6/2002 | Stow | |
| 6,467,339 B1 | | 10/2002 | Descoteaux et al. | |

FOREIGN PATENT DOCUMENTS

| | | |
|---|---|---|
| DE | 195 06 642 C1 | 3/1996 |
| EP | 0 766 063 A3 | 4/1997 |
| EP | 0 766 063 A2 | 4/1997 |
| EP | 0766 063 B1 | 4/2003 |

OTHER PUBLICATIONS

European Search Report (3 pgs.); of Appl. General Electric Co.; EP Appl No.: 03253244.2–2213.

* cited by examiner

*Primary Examiner*—Hoa Q. Pham
(74) *Attorney, Agent, or Firm*—Armstrong Teasdale LLP; William Scott Andes

(57) ABSTRACT

A method enables a surface contour of an object to be measured using an optical system. The method includes positioning the object in a measurement cell, filling the cell with fluid, transmitting light towards the object in the measurement cell, measuring the illumination of a surface of the object, generating an image of the object based on the illumination of the surface.

17 Claims, 3 Drawing Sheets

US 6,906,808 B2

METHODS AND APPARATUS FOR MEASURING A SURFACE CONTOUR OF AN OBJECT

BACKGROUND OF THE INVENTION

This invention relates generally to optical systems and more particularly, to methods and apparatus for measuring a surface contour of an object.

Accurately measuring a contoured surface of an object may be a significant factor in determining a manufacturing time of the object, as well as a factor used to determine subsequent maintenance and repair costs and activities. More specifically, when the object is a gas turbine engine blade airfoil, or an airfoil forging die, accurately measuring the contour of the blade airfoil, or the forging die, may be one of the most significant factors affecting an overall cost of fabrication of the gas turbine engine, as well as subsequent modifications, repairs, and inspections of the blade airfoils.

Conventional inspection methods include using a plastic template that fits over the blade to enable comparisons to be performed between the blade and dimensions indicated on the template. However, because of the contour of the blade airfoils, fabricating such templates may be a costly and time-consuming process. Furthermore, obtaining accurate comparisons between the template and the blade at the various orientations of the blade airfoil may also be a difficult task.

To facilitate more accurate shape and orientation verifications, at least some known inspection methods include guillotine gauges and/or coordinate measuring machines (CMM). Guillotine gauges are expensive and require a high degree of operator skill and interaction with the gauging process. More specifically, to accurately use a guillotine gauge, a plurality of accurate measurements must be obtained using feeler gauges and/or calipers. However, such verification techniques may be time intensive as they may require manual recording of measurements.

CMMs have also been used to obtain dimensional information of an object. Within such systems, a probe is positioned within a three-coordinate measurement space to contact an object surface, at which time the position of the probe tip is measured. The process is repeated many times to determine a surface contour. CMMs are expensive and such a verification process may be time-consuming to accurately map the surface profile and location of an blade airfoil. Furthermore, within at least some known CMMs, an accuracy of the CMM may degrade when measuring surface contours having a small radius, such as the leading and trailing edges of an blade airfoil.

BRIEF SUMMARY OF THE INVENTION

In one aspect, a method for measuring a surface contour of an object using an optical system is provided. The method comprises positioning the object in a measurement cell, filling the cell with fluid, transmitting light towards the object in the measurement cell, measuring the illumination of a surface of the object, generating an image of the object based on the illumination of the surface.

In another aspect of the invention, an optical system for measuring a surface contour of an airfoil-shaped object is provided. The optical system comprises a measurement cell comprising a cavity sized to receive the object therein, wherein the measurement cell is filled with a semi-opaque fluid, a light source for transmitting light towards the measurement cell, and an image acquisition device for measuring an illumination of the airfoil-shaped object, wherein the image acquisition device is configured to generate an image of a surface of the object based on the illumination of the airfoil-shaped object.

DETAILED DESCRIPTION OF THE INVENTION

Figure 1:
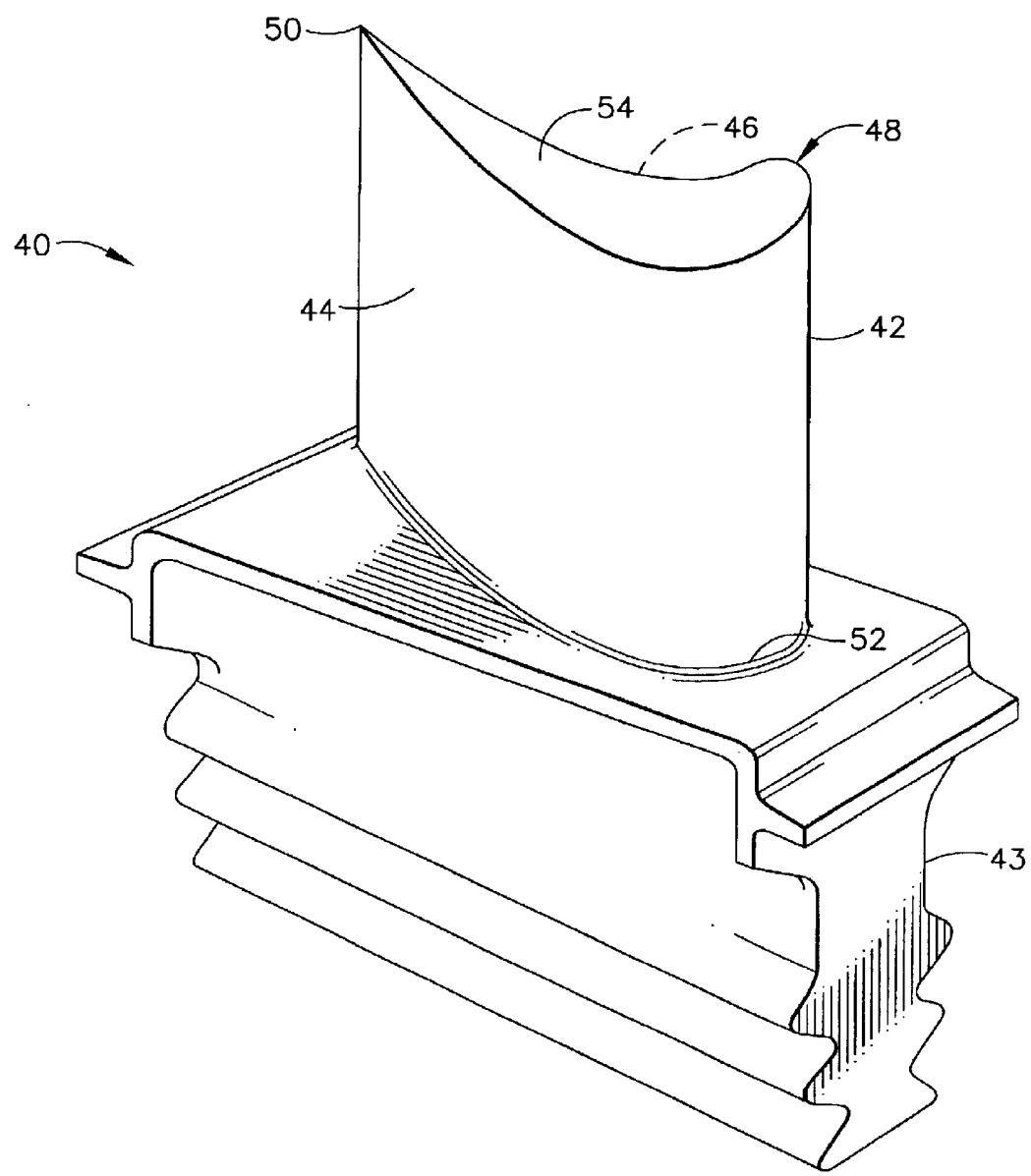
FIG. 1 is a perspective view of an blade airfoil for a gas turbine engine.

FIG. 1 is a perspective view of a turbine blade 40 that may be used with a gas turbine engine (not shown). In one embodiment, a plurality of turbine blades 40 form a high pressure turbine rotor blade stage (not shown) of the gas turbine engine. Each blade 40 includes a hollow airfoil 42 and an integral dovetail 43 that is used for mounting airfoil 42 to a rotor disk (not shown) in a known manner. Alternatively, blades 40 may extend radially outwardly from a disk (not shown), such that a plurality of blades 40 form a disk (not shown).

Each airfoil 42 includes a first contoured sidewall 44 and a second contoured sidewall 46. First sidewall 44 is convex and defines a suction side of airfoil 42, and second sidewall 46 is concave and defines a pressure side of airfoil 42. Sidewalls 44 and 46 are joined at a leading edge 48 and at an axially-spaced trailing edge 50 of airfoil 42. More specifically, airfoil trailing edge 50 is spaced chordwise and downstream from airfoil leading edge 48. First and second sidewalls 44 and 46, respectively, extend longitudinally or radially outward in span from a blade root 52 positioned adjacent dovetail 43, to an airfoil tip 54.

Figure 2:
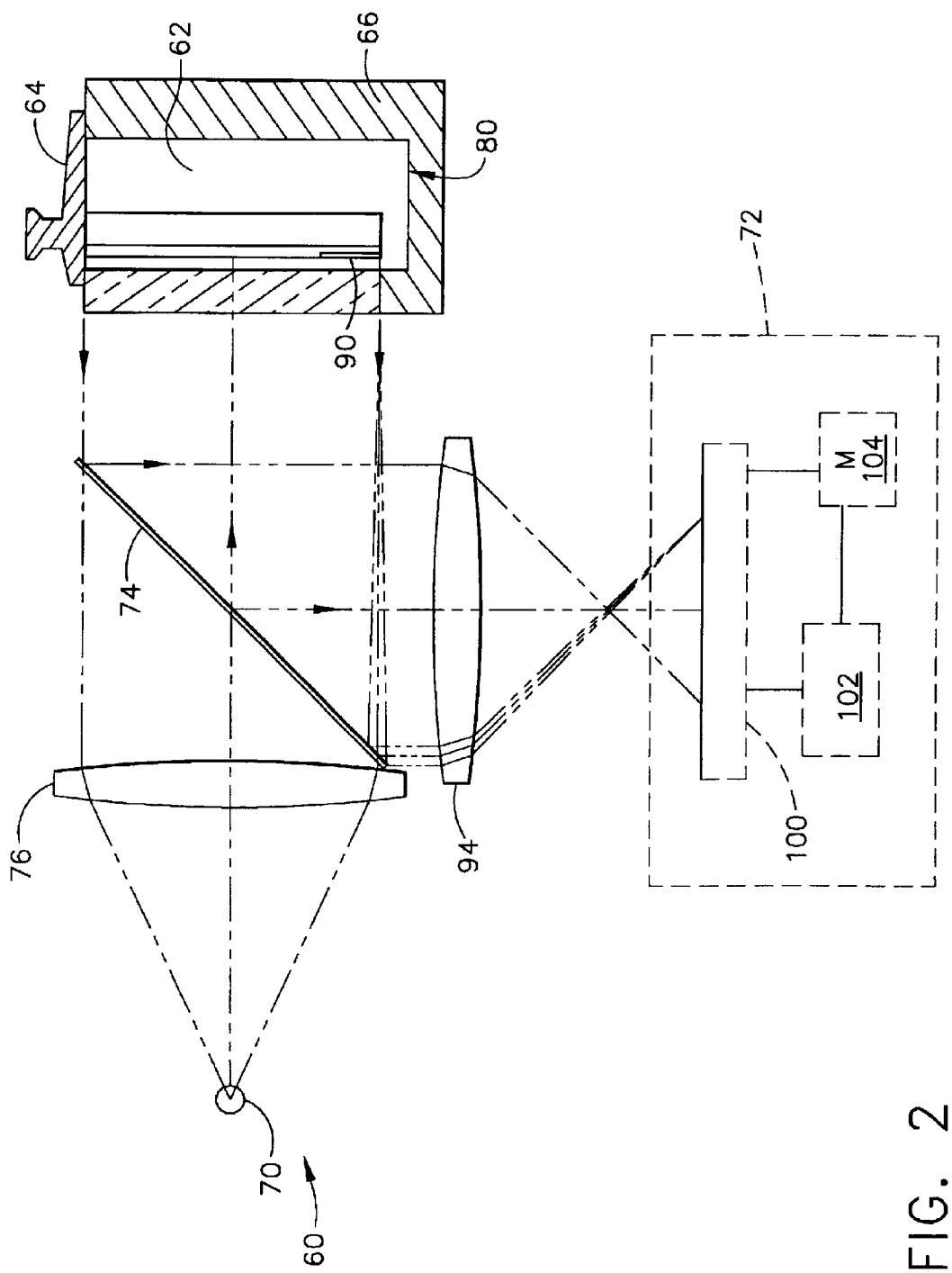
FIG. 2 is a schematic illustration of an optical system for measuring a surface contour of an airfoil-shaped object such as the blade airfoil shown in FIG. 1.
Figure 3:
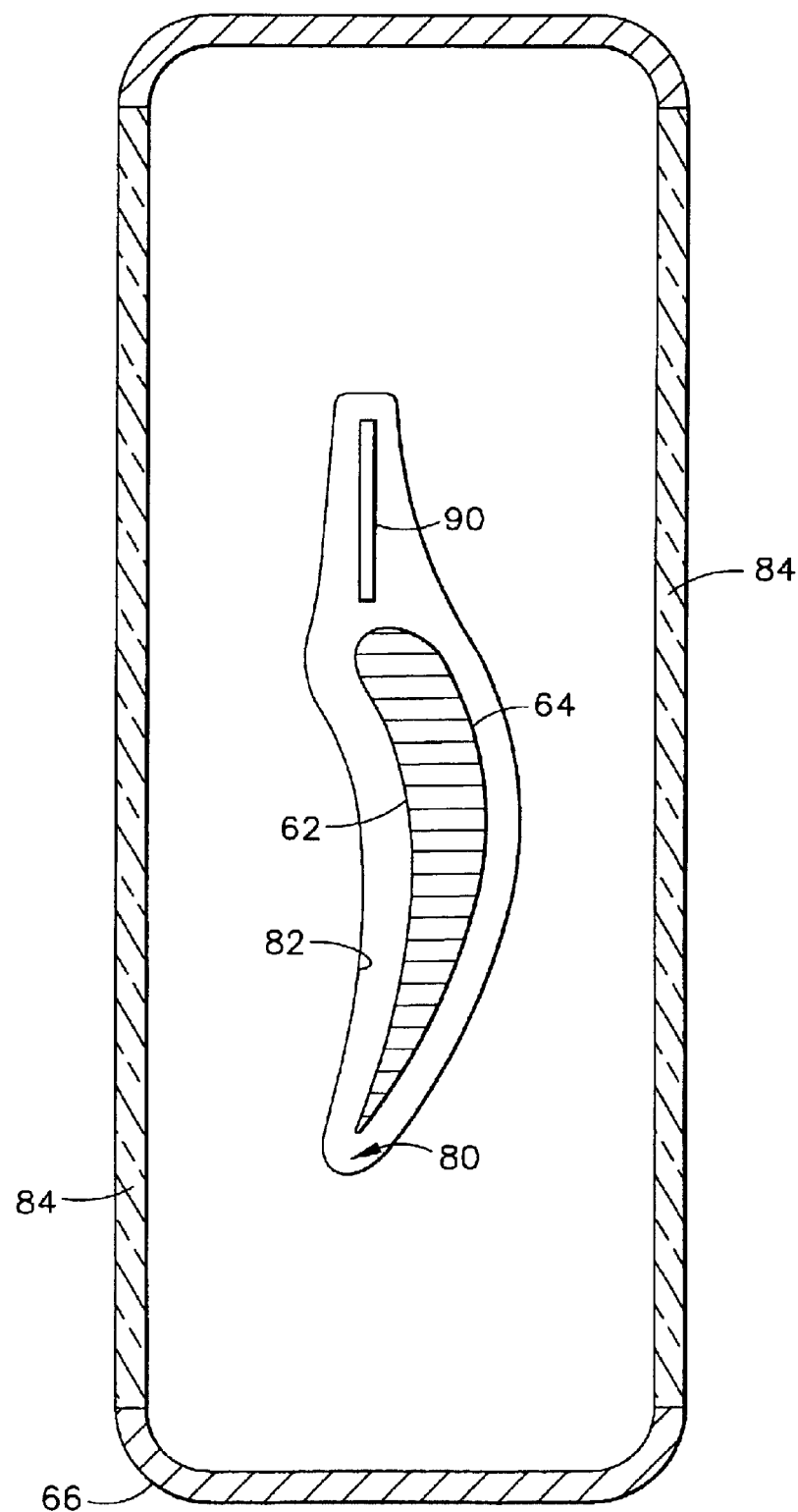
FIG. 3 is an exemplary cross-sectional view of a measurement cell that may be used with the optical system shown in FIG. 2.

FIG. 2 is a schematic illustration of an optical system 60 for measuring a surface contour 62 of an airfoil-shaped object 64, such as blade airfoil 42 (shown in FIG. 1). In an alternative embodiment, optical system 60 is used to measure a surface contour of an object, such as an airfoil-shaped forge die used in fabricating a blade airfoil. FIG. 3 is an exemplary cross-sectional view of a measurement cell 66 that may be used with optical system 60. Optical system 60 includes a light source 70, an image acquisition sub-system 72, a beam splitter 74, and measurement cell 66. Light source 70 is known in the art and directs light towards measurement cell 66. More specifically, light source 70 directs light towards beam splitter 74 which facilitates directing light towards measurement cell 66 such that light striking measurement cell 66 is substantially normal to surface contour 62. In the exemplary embodiment, light source 70 directs light through a lens 76 prior to the light being directed by beam splitter 74. Lens 76 facilitates focusing light originating from light source 70 towards beam splitter 74. In an alternative embodiment, optical system 60 does not include lens 76.

Measurement cell 66 includes a cavity 80 defined therein. More specifically, cavity 80 is defined by at least one contoured wall 82 such that wall 82 substantially matches a contour of surface contour 62. Cavity 80 is sized to receive blade airfoil 64 therein. In one embodiment, walls 82 are removable from cell 66 to accommodate blade airfoils having different surface contours or different orientations than that of airfoil-shaped object 64.

Measurement cell 66 includes a transparent front surface 84 that enables light originating from light source 70 may enter cavity 80 through surface 84. Front surface 84 also enables light originating from light source 70 to strike against a surface inserted within cavity 80 and being measured. Accordingly, measurement cell cavity 80 is also sized to receive a reference surface or a calibration wedge 90 therein. More specifically, reference surface 90 is inserted within cavity 80 such that surface 90 is substantially parallel with an edge of the object being measured that is closest to cell front surface 84.

A second lens 94 is positioned to receive light reflected or illuminated from measurement cell 66. Specifically, light illuminated from measurement cell 66 is redirected with beam splitter 74 towards lens 94. Lens 94 facilitates focusing light reflected from measurement cell 66 towards image acquisition sub-system 72. In the exemplary embodiment, image acquisition sub-system 72 includes a charge coupled device (CCD) camera 100 that houses a CCD chip. Specifically, camera 100 shields the chip to facilitate preventing the CCD chip from being exposed to undesirable light, such that the chip is substantially exposed to only light being reflected from an object within cell 66. CCD cameras 100 are known in the art, and in the exemplary embodiment, camera 100 is coupled to a PC-based frame grabber board 102 and a processor 104. Grabber board 102 and processor 104 are known in the art. Processor 104 is configured to execute commercially available contour mapping programs. In one embodiment, equipment and software used to perform such an inspection, includes a highly uniform illumination source, such as the "Cloudy Day Illuminator", commercially available from Robot Vision Systems, Inc. (RVSI), a 10-bit digital CCD camera with 1024×1024 pixel array, commercially available from Sony Electronics, Inc., a compatible frame grabber board, commercially available from Matrox Electronic Systems Ltd., and Inspector Software® commercially available from Matrox Electronic Systems Ltd., for image analysis and to determine part/shape deviations.

During use, measurement cell 66 is initially filed with a semi-opaque fluid. In one embodiment, the semi-opaque fluid is a diluted India Ink. The object having a surface contour to be measured, or in the exemplary embodiment, airfoil-shaped object 64 including surface contour 62, is then coated with an optically uniform coating. In one embodiment, the coating is sprayed on object 64. In another embodiment, optically uniform tape is applied to airfoil-shaped object 64.

Object 64 is then inserted within measurement cell cavity 80 such that surface contour 62 is visible through cell front surface 84. Additionally, a reference surface 90 that has been coated with the same optically uniform coating is inserted within cell 66 such that surface 90 is substantially parallel with the edge of surface contour 62 that is closest cell front surface 84. In an alternative embodiment, an un-coated blade is used as an initial reflectance reference prior to cell 66 being filled with fluid. Reference surface 90 provides a calibration surface that facilitates system 60 correcting for variations of light intensity and dilution level of the fluid.

Light source 60 is then energized and light is directed through beam splitter 74 towards airfoil-shaped object 64 and reference surface 90. As each surface 62 and 90 is illuminated, the fluid both absorbs and scatters the light. Generally, the more fluid that is between surface contour 62 and cell front surface 84, the more scattering, and as surface contour 62 becomes less visible, the less light is reflected by surface contour 62. For example, if object 64 is coated with a white optically uniform coating, and the semi-opaque fluid is dark, surface contour 62 will appear darker as a thickness of the fluid layer between airfoil-shaped object 64 and surface 84 is increased, and eventually will disappear behind the fluid layer.

Image acquisition sub-system 72 receives light reflected by surface contour 62 and reference surface 90. More specifically, a distance between reference surface 90 and surface contour 62 is expressed in terms of the brightness of each object as seen through the semi-opaque fluid. Image acquisition sub-system 72 captures the reflected light via CCD camera 100 and its associated detector array. More specifically, the light is digitized into a gray scale image, whose individual pixel values may then be expressed in terms of the difference between surfaces 62 and 90. Because the shape of reference surface 90 is known, and because surface 90 is fixed relative to surface contour 62, actual measurements of profile of surface contour 62 may be determined, as well as evaluations of the alignment of electrodes used in an electro-chemical machining, ECM, process of object 64 may be determined. In another embodiment, the gray scale image is used to generate topographic or colorized maps of surface contour 62. As a result, optical system 60 enables an entire side image of airfoil-shaped object 64 to be generated in the time it takes to capture one frame using CCD camera 100.

The above-described optical system is cost-effective and highly reliable. The optical system facilitates generating a map of an entire surface within a field of view in a timely manner. Furthermore, using the semi-opaque fluid provides a relatively inexpensive and reliable method for mapping a surface contour.

While the invention has been described in terms of various specific embodiments, those skilled in the art will recognize that the invention can be practiced with modification within the spirit and scope of the claims.

What is claimed is:

1. A method for measuring a surface Contour of an object using an optical system, said method comprising:

positioning the object in a measurement cell having at least one transparent surface;

filling the cell with a semi opaque fluid such that a layer of fluid extends between the object and the at least one transparent surface;

transmitting light through at least one beam splitter towards the object in the measurement cell, wherein the at least one beam splitter is positioned between the light source and the measurement cell;

redirecting an illumination of the light reflected from the object using the at least one beam splitter;

focusing the illumination from the at least one beam splitter;

measuring the illumination of a surface of the object; and generating an image of the object based on the illumination of the surface.

2. A method in accordance with claim 1 wherein positioning the object in a measurement cell further comprises positioning the object in a cavity defined within the cell and having at least one wall that that has a contour that is substantially similar to a contour of the surface of the object being measured.

3. A method in accordance with claim 1 further comprising coating the surface of the object being measured with an optically uniform coating prior to positioning the object within the measurement cell.

4. A method in accordance with 3 wherein coating the surface of the object being measured further comprises coating the surface of the object to facilitate controlling the reflectance of the surface of the object.

5. A method in accordance with claim 1 wherein positioning the object in a measurement cell further comprises positioning the object in a measurement cell including a reference surface.

6. A method in accordance with claim 5 wherein measuring the illumination of a surface of the object further comprises determining a distance of the surface of the object from the reference surface.

7. A method in accordance with claim 1 wherein generating an image of the object based on the illumination of the surface further comprises generating an image of the surface of the object using a charge coupled device detector array.

8. A method in accordance with claim 1 wherein focusing the illumination from a surface of the object further comprises focusing the illumination from the at least one beam splitter through a lens.

9. A method in accordance with claim 1 wherein generating an image of the object further comprises generating a digital image of a blade airfoil surface.

10. An optical system for measuring a surface contour of an airfoil-shaped object, said optical system comprising:

a measurement cell comprising a cavity sized to receive the airfoil-shaped object therein, said measurement cell filled with a semi-opaque fluid;

a light source for transmitting light towards said measurement cell;

a beam splitter between the light source and said measurement cell, said beam splitter for redirecting an illumination of the airfoil-shaped object;

an image acquisition device for measuring the illumination of the airfoil-shaped object, said image acquisition device configured to generate an image of a surface of the airfoil-shaped object based on the illumination of the airfoil-shaped object; and a lens between said beam splitter and said image acquisition device.

11. An optical system in accordance with claim 10 wherein said measurement cell cavity further comprises at least one wall defining said cavity and having a contour that is substantially similar to that of a contour of the surface of the airfoil-shaped object.

12. An optical system in accordance with claim 10 wherein said lens focuses the illumination from said beam splitter towards said image acquisition device.

13. An optical system in accordance with claim 12 wherein said beam splitter configured to direct light towards said measurement cell such that the light is substantially normal to the surface of the airfoil-shaped object.

14. An optical system in accordance with claim 10 wherein said measurement cell further comprises a reference surface.

15. An optical system in accordance with claim 10 wherein said image acquisition device further configured to determine a distance of the surface of the airfoil-shaped object from said reference surface.

16. An optical system in accordance with claim 15 wherein said image acquisition device further configured to generate a digital image of the surface of the airfoil-shaped object.

17. An optical system in accordance with claim 15 wherein said image acquisition device further configured to generate a gray scale image of the surface of the airfoil-shaped object.

* * * * *

UNITED STATES PATENT AND TRADEMARK OFFICE
CERTIFICATE OF CORRECTION

PATENT NO. : 6,906,808 B2 Page 1 of 1
APPLICATION NO. : 10/160532
DATED : June 14, 2005
INVENTOR(S) : Trantow et al.

It is certified that error appears in the above-identified patent and that said Letters Patent is hereby corrected as shown below:

In Claim 1, column 4, line 43, delete "Contour" and insert therefor -- contour --.

In Claim 1, column 4, line 47, delete "semi opaque" and insert therefor
-- semi-opaque --.

In Claim 4, column 5, line 5, delete "with 3" and insert therefor -- with claim 3 --.

Signed and Sealed this

Sixth Day of November, 2007

JON W. DUDAS
*Director of the United States Patent and Trademark Office*